(12) United States Patent
Poon et al.

(10) Patent No.: US 8,509,069 B1
(45) Date of Patent: Aug. 13, 2013

(54) CELL SHARING TO IMPROVE THROUGHPUT WITHIN A NETWORK DEVICE

(75) Inventors: Wing Leong Poon, Sunnyvale, CA (US); Venkatraman Chandrasekaran, Cupertino, CA (US); Srihari Vegesna, San Jose, CA (US); Sarin Thomas, Sunnyvale, CA (US); David J. Ofelt, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 560 days.

(21) Appl. No.: 12/754,377

(22) Filed: Apr. 5, 2010

Related U.S. Application Data

(60) Provisional application No. 61/289,285, filed on Dec. 22, 2009.

(51) Int. Cl.
*H04L 12/26* (2006.01)
(52) U.S. Cl.
USPC ............................ 370/230; 370/392; 370/413
(58) Field of Classification Search
None
See application file for complete search history.

(56) References Cited

U.S. PATENT DOCUMENTS

| | | | | |
|---|---|---|---|---|
| 7,277,429 B2* | 10/2007 | Norman et al. | | 370/389 |
| 7,298,754 B1* | 11/2007 | Miller et al. | | 370/401 |
| 7,486,678 B1* | 2/2009 | Devanagondi et al. | | 370/394 |
| 8,077,727 B2* | 12/2011 | Lipschutz | | 370/395.4 |
| 8,090,869 B2* | 1/2012 | Mathews | | 709/238 |
| 8,218,538 B1* | 7/2012 | Chidambaram et al. | | 370/386 |
| 2003/0058872 A1* | 3/2003 | Berggreen et al. | | 370/401 |
| 2003/0123468 A1* | 7/2003 | Nong | | 370/412 |
| 2005/0207436 A1* | 9/2005 | Varma | | 370/412 |
| 2006/0239259 A1* | 10/2006 | Norman et al. | | 370/386 |
| 2007/0268907 A1* | 11/2007 | Paul et al. | | 370/395.1 |
| 2008/0044181 A1 | 2/2008 | Sindhu | | |
| 2010/0158031 A1* | 6/2010 | Thomas et al. | | 370/412 |
| 2011/0122892 A1* | 5/2011 | Lipschutz et al. | | 370/474 |
| 2011/0164616 A1* | 7/2011 | Kloth et al. | | 370/392 |

* cited by examiner

*Primary Examiner* — Michael J Moore, Jr.
(74) *Attorney, Agent, or Firm* — Shumaker & Sieffert, P.A.

(57) ABSTRACT

A method includes receiving packets from a network with a plurality of packet-forwarding engines (PFEs) of a router, wherein the plurality of PFEs are interconnected by a switch fabric, determining an egress one of the PFEs for each of the packets, and forming fixed-sized fabric cells that share data associated with the packets that are destined for the same egress PFE while preventing packets destined for different egress PFEs to share any of the fabric cells. The fabric cells are transmitted through the switch fabric to communicate the packets to the egress PFEs.

40 Claims, 8 Drawing Sheets

CELL SHARING TO IMPROVE THROUGHPUT WITHIN A NETWORK DEVICE

This application claims the benefit of U.S. Provisional Application No. 61/289,285, filed Dec. 22, 2009, the entire contents of which are incorporated by reference herein.

TECHNICAL FIELD

The invention relates to computer networks and, more particularly, to communicating packets within computer networks.

BACKGROUND

A computer network is a collection of interconnected computing devices that can exchange data and share resources. A physical connection between devices within the network is generally referred to as a link. In a packet-switching network, such as an Ethernet network, network devices that provide the network infrastructure communicate data by dividing the data into variable-length blocks called packets, which are individually routed across the network from a source device to a destination device. The destination device extracts the data from the packets and assembles the data into its original form. The intermediate network devices that perform packet switching, such as high-speed routers or network switches, often have internal switch fabrics that are engineered specifically for the demands of high-speed packet switching.

In some cases, a high-speed network device may include packet forwarding engines interconnected by a switch fabric, where that each received packet is segmented into fixed-size fabric cells that are transmitted over the internal switch fabric between the packet forwarding engines. The packet forwarding engines segment inbound packets into the fabric cells that are input into the internal switch fabric, and reassemble packets from the fabric to form outbound packets to be output to next hops within the network. Internal packet queues maintained within the packet forwarding engines may cause varying packet transfer delay within the network, and such delay is tolerated and managed by the sending and receiving device as well as the intermediate routers and other devices of the packet-switching network.

SUMMARY

In general, techniques are described for sharing a single fabric cell between contents of more than one packet. In particular, the techniques described herein allow a packet forwarding engine (PFE) of a network device, such as a high-speed router, to dynamically determine whether to cell-share for each packet. In one embodiment, cell-sharing is done on a per-fabric destination basis. That is, contents of two packets may share a cell if they will be transmitted to the same fabric destination. Where an ingress PFE maintains queues for each fabric destination, the cell-sharing decisions are performed separately for each queue. Shared cells may be considered a new class of cells.

According to the techniques described herein, the cell-sharing decision is reflected in the fabric requests sent out by the ingress PFE, at the time the packet is enqueued in a queue associated with the fabric destination. This is because the fabric data cell throughput between two PFEs is determined by the exchange of fabric requests and grants which preceded it. Therefore, the ingress PFE needs to make the decision as to whether a packet can share a fabric cell before sending out the fabric requests associated with the packet. A cell-sharing decision is likewise made again at the time of dequeuing, after the fabric grant has been received. To ensure consistency, the enqueuing mechanism and the dequeuing mechanism use like processes for the cell-sharing determination.

In one example, fabric cells may have a fixed size of sixty-four bytes. In the absence of fabric cell sharing, a fabric cell can contain at most one packet, and so a sixty-five byte packet would require two fabric cells to transmit the packet across the switch fabric from the ingress PFE to the egress PFE. Thus, in this worst-case scenario only 51% of the data cell payload is utilized. This represents a significant drop-off in bandwidth, and can result in packet throughput "sawtooths." If the PFEs are configured to allow two packets to share a fabric cell (i.e., with a thirty-two byte boundary), such that the first thirty-two bytes of a second packet can share the same fabric cell as the last thirty-two bytes (or less) of the first packet, the PFEs can reclaim some of the previously unused data payload and the worst-case utilization would improve to 68%.

To address the packet sawtooth effect that may occur in the absence of cell-sharing capability, one approach may be to build higher intrinsic fabric bandwidth (e.g., on the order of twice what is required) compared to the line rate bandwidth on the Wide Area Network (WAN) side. However, additional fabric speed-up may place unnecessary burden on a central processing unit (CPU) of the PFE as well as the queuing subsystem to be able to process and enqueue packets as quickly as they can arrive from the fabric. This may specifically present a problem when the PFE has no means to throttle the fabric. That is, in one example embodiment, without a means of flow-controlling the fabric, the CPU and queuing subsystem must be able to process and enqueue packets at a faster rate than required by the wide area network (WAN). Looked at another way, the CPU and queuing subsystem need to process and enqueue packets at a faster rate, when at most a slower rate is needed to meet line rate. When fabric cell-sharing is used, by reducing the possible range of data payload utilization, the fabric speed-up profile across packet sizes becomes more even. A uniform speed-up profile may be better-behaved and allows for the freedom to lower the level of fabric utilization, and thereby scale the overall fabric speed-up, for better system performance without jeopardizing line rate performance in the worst-case scenarios.

The techniques described herein may adjust dynamically to a state of fabric congestion, and employ cell-sharing accordingly. When the fabric is not congested, packets are typically transmitted promptly, without necessarily waiting for a following packet to cell-share with. When the fabric is congested, the packet forwarding engine will automatically share cells among enqueued packets.

In one embodiment, a method includes receiving packets from a network with one of a plurality of PFEs of a router, wherein the plurality of PFEs are interconnected by a switch fabric, determining an egress one of the PFEs for each of the packets, and forming fixed-sized fabric cells that share data associated with the packets that are destined for the same egress PFE while preventing packets destined for different egress PFEs to share any of the fabric cells. The method also includes transmitting the fabric cells through the switch fabric to communicate the packets to the egress PFEs.

In a further embodiment, a router comprises a plurality of interfaces for receiving packets from a network, a plurality of packet forwarding engines (PFEs) each coupled to at least one or more of the plurality of interfaces, and a switch fabric that interconnects the plurality of PFEs. A ingress one of the PFEs forms fixed-sized fabric cells that share data associated with received packets that are destined for the same egress PFE while preventing packets destined for different egress PFEs to share any of the fabric cells, and transmits the fabric cells through the switch fabric to communicate the packets to the egress PFEs.

In yet another embodiment, a computer-readable storage medium comprises instructions for causing a programmable processor to receive packets from a network with one of a plurality of PFEs of a router, wherein the plurality of PFEs are interconnected by a switch fabric, and determine an egress one of the PFEs for each of the packets. The instructions also cause the programmable processor to form fixed-sized fabric cells that share data associated with the packets that are destined for the same egress PFE while preventing packets destined for different egress PFEs to share any of the fabric cells, and transmit the fabric cells through the switch fabric to communicate the packets to the egress PFEs.

In another embodiment, a method includes receiving a first packet with one of a plurality of packet-forwarding engines (PFEs) of a router, wherein the plurality of PFEs are interconnected by a switch fabric, and determining a destination PFE for the first packet. The method also includes enqueuing chunks of data for the first packet in a queue associated with the destination PFE, determining a number of fixed-size cells needed for transmission of the chunks of data for the first fabric over a switch fabric to a fabric destination of the router, and determining whether a fixed-size cell may be shared between a portion of the first packet having an end-of-packet and a portion of a second packet received by the one of the plurality of PFEs having a start-of-packet, wherein the second packet is destined for the same fabric destination as the first packet. Upon determining that the fixed-size cell may be shared, the method also includes adjusting a number of fabric requests to be scheduled for the portion of the second one of the packets having the start-of-packet, such that the single fabric request is the only fabric request sent to request permission for transmitting the shared cell that includes both the end-of-packet of the first packet and the start-of-packet of the second packet.

In a further embodiment, a method includes receiving packets from a network with a plurality of nodes of a network device, wherein the plurality of nodes are interconnected by paths, and determining an egress one of the nodes for each of the packets. The method also includes forming fixed-sized fabric cells that share data associated with the packets that are destined for the same egress node while preventing packets destined for different egress node to share any of the fabric cells, and transmitting the fabric cells through the paths to communicate the packets to the egress nodes.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
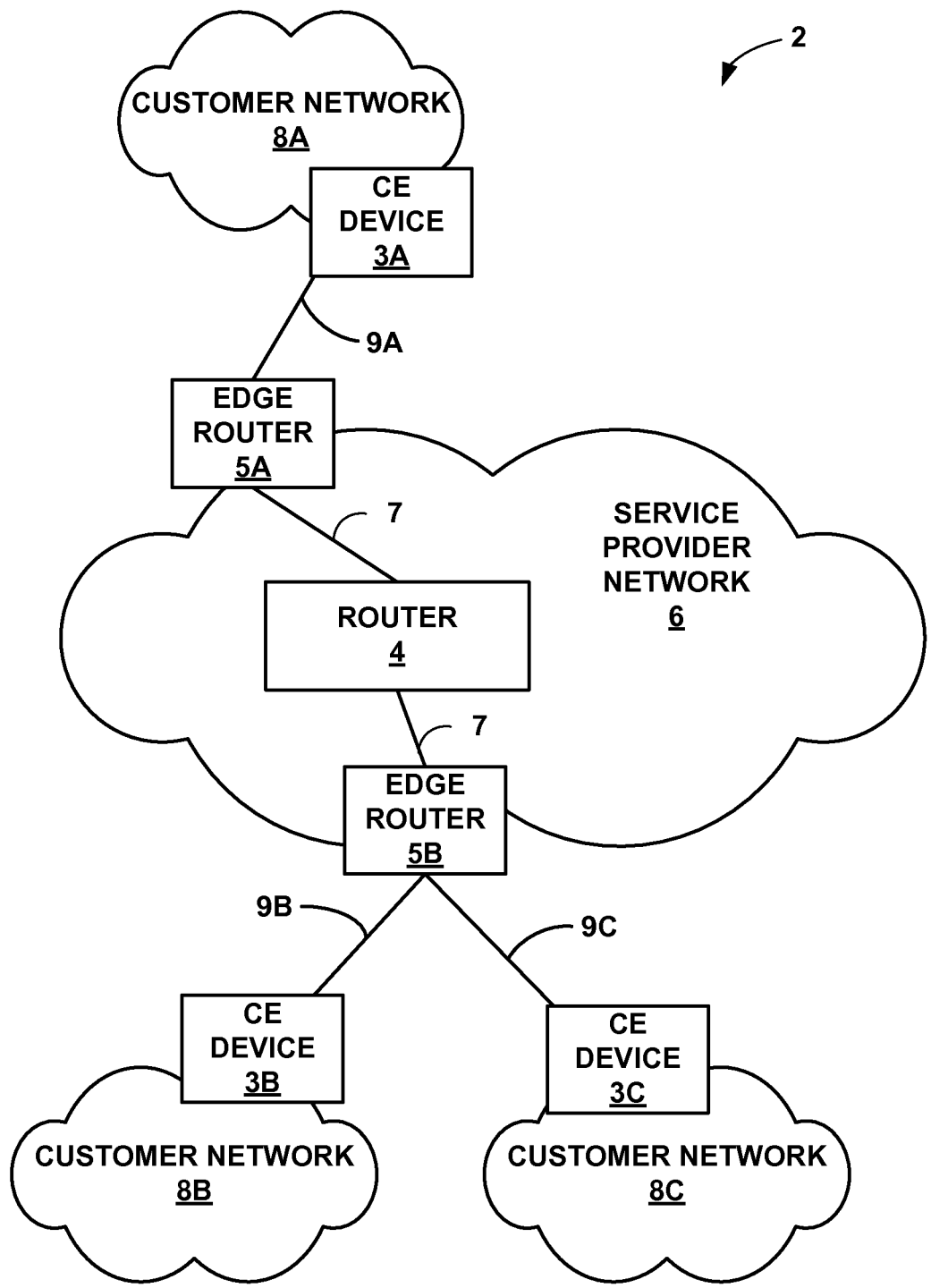
FIG. 1 is block diagram of an example computing environment in which a service provider network includes routers configured for switching packets using fabric cell sharing in accordance with the techniques described herein.

FIG. 1 is a block diagram illustrating an example system 2 in which some or all of edge routers 5A-5B ("edge routers 5") and router 4 of service provider network 6 may be configured for using internal switch fabric cell sharing in accordance with the techniques described herein.

In this example, edge routers 5 provide customer edge (CE) devices 3A-3C ("CE devices 3") associated with customer networks 8A-8D ("customer networks 8") with access to service provider network 6. In the illustrated embodiment, edge router 5A is coupled to CE device 3A via access link 9A. Edge router 5B is coupled to CE devices 3B and 3C via access links 9B, and 9C, respectively. CE devices 3 may be, for example, routers or switches. Customer networks 8 may be, for example, networks for geographically separated sites of an enterprise. Each of customer networks 8 may include one or more additional computing devices (not shown), such as, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network 2 illustrated in FIG. 1 is merely exemplary. For example, an enterprise may include any number of customer networks 8. Nonetheless, for ease of description, only customer networks 8A-8C are illustrated in FIG. 1.

In accordance with the techniques described herein, one or more of router 4, edge routers 5, and CE devices 3 are configured to perform fabric cell sharing. For example, each of edge routers 5 and router 4 may include one or more packet forwarding engines (PFEs) configured to switch packets from an input interface to an output interface of the router using a switch fabric internal to the router. When router 4 and edge routers 5A receive packets, the ingress PFE segments the packets into fabric cells, i.e., individual units of data to be transported across the switch fabrics internal to the router. According to the techniques described herein, the PFEs will automatically allow portions of two or more packets to share a single fabric cell under certain circumstances, which can improve packet throughput. As described in further detail below, the PFEs are configured to apply enqueuing and dequeuing mechanisms that support sharing the contents of more than one packet among a single fabric cell.

Although not illustrated, service provider network 6 may be coupled to one or more networks administered by other providers, and may thus form part of a large-scale public network infrastructure, e.g., the Internet. Consequently, customer networks 8 may be viewed as edge networks of the Internet. Service provider network 6 may provide computing devices within customer networks 8 with access to the Internet, and may allow the computing devices within the customer networks to communicate with each other. Service provider network 6 may include a variety of network devices other than edge routers 5. Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of links 9 and/or 7, such that the network elements of system 2 are not directly coupled.

Router 4 or edge routers 5 may be multi-chassis routers that include multiple routing nodes (not shown in FIG. 1) that are physically coupled and configured to operate as a single routing node. That is, to peer routers of network environment 2, router 4 or edge routers 5 each appear as a single routing device. For example, although edge router 5A includes a plurality routing nodes, from the perspective of peer router 5B, the multi-chassis edge router 5A has a single network address and maintains single peer routing sessions for each routing protocol maintaining peer routing sessions with each of the edge routers 5.

When edge router 5A is a multi-chassis router, the multiple routing nodes of edge router 5A forward network traffic, on a data plane of edge router 5A using a switch fabric cell sharing. As with the single-chassis router example, the PFEs of a multi-chassis router are configured to apply enqueuing and dequeuing mechanisms that support sharing the contents of more than one packet among a single fabric cell. Data plane and control plane communications between the multiple routing nodes of edge router 5A may occur using multiplexed optical interconnects or by other means. In some examples, edge router 5A may include a multi-stage switch fabric, such as a 3-stage Clos switch fabric, that relays packet-switched communications between the routing nodes via optical interconnects using multiplexed communications. A multi-chassis router that employs optical interconnects using multiplexed communications is described in U.S. Publication No. 2008/0044181, entitled MULTI-CHASSIS ROUTER WITH MULTIPLEXED OPTICAL INTERCONNECTS, filed on Aug. 1, 2007, the entire contents of which are incorporated by reference herein.

In one example configuration, the stages of the common switch fabric may be distributed among the individual routing nodes of the multi-chassis router in a decentralized manner. For example, the multi-chassis router may include a plurality of line card chassis (LCCs) that cooperate so as to operate as a single router within a network. Implementation of the multi-stage switch fabric may be distributed to the LCCs, and the LCCs may communicate using multiplexed communications. Alternatively, one or more central switch nodes, such as a switch control chassis (SCC), may be incorporated within the multi-chassis router.

Although discussed for purposes of example primarily with respect to routers, the techniques of this disclosure may be implemented by other network devices as well. For example, switches may implement the techniques of this disclosure in some examples to improve Layer Two (that is, Data Link Layer) functionality of the switches. In some examples, the techniques of this disclosure may be implemented by Ethernet switches. Although the techniques of this disclosure are described for purposes of example with respect to SP network 6 and customer networks 8, the techniques may be similarly applied in devices associated with other contexts, such as non-edge routers and non-edge customer devices.

Figure 2:
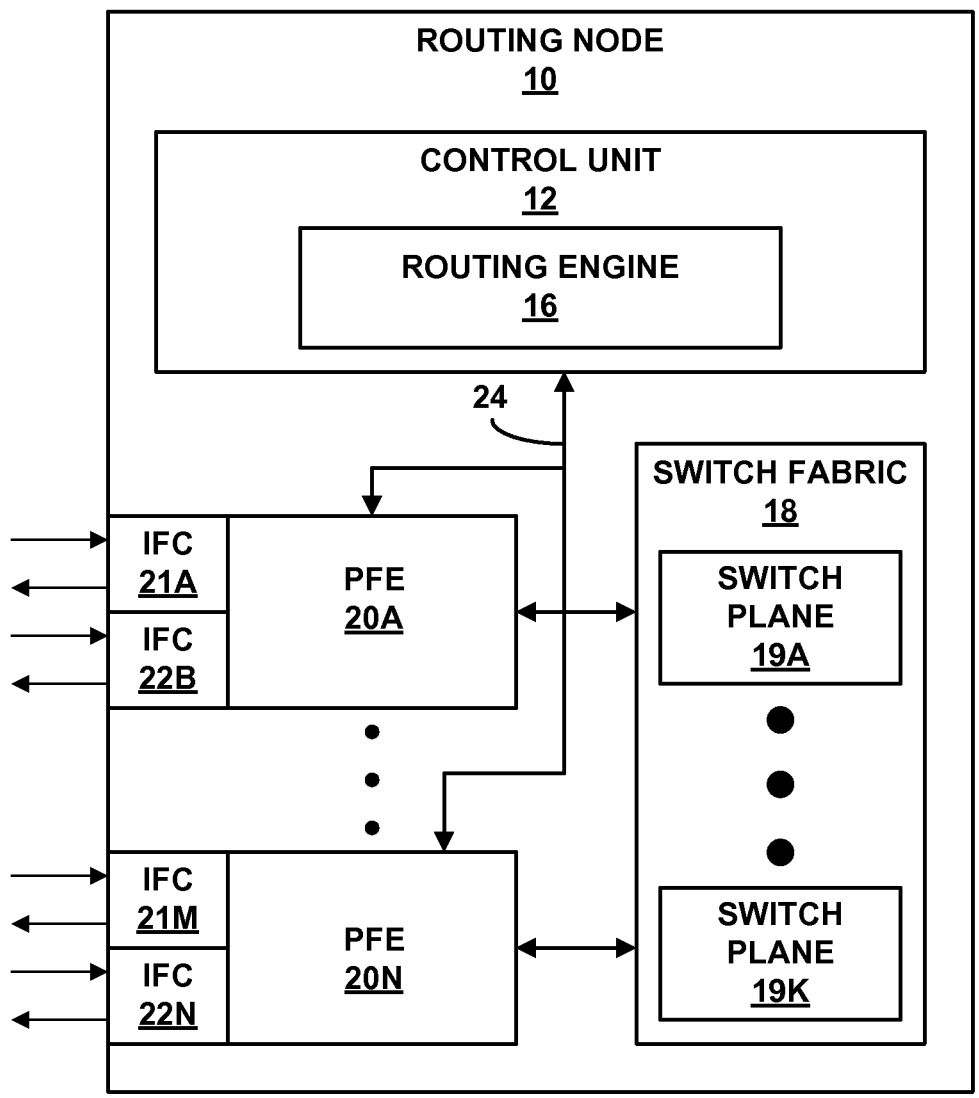
FIG. 2 is a block diagram illustrating an exemplary router that operates in accordance with the techniques of this disclosure.

FIG. 2 is a block diagram illustrating an example routing node 10 that includes PFEs 20A-20N ("PFEs 20") and switch fabric 18 capable of implementing fabric cell sharing. In this example, routing node 10 also includes a control unit 12 that includes a routing engine 16. PFEs 20 may receive and send data via interface cards 21A through 21N ("IFCs 21"). In other embodiments, each of PFEs 20 may comprise more or fewer IFCs. Switch fabric 18 provides an interconnect mechanism for forwarding data between PFEs 20 for transmission over a network, e.g., the Internet.

Routing engine 16 maintains routing tables, executes routing protocol and controls user access to standalone routing node 10. In this example, routing engine 16 is connected to each of PFEs 20 by a dedicated link 24, with may be an internal Ethernet link. For example, dedicated link 24 may comprise a 100 Mbps Ethernet connection. Routing engine 16 maintains routing information that describes a topology of a network, and derives a forwarding information base (FIB) in accordance with the routing information. Routing engine 16 copies the FIB to each of PFEs 20. This allows the FIB in each of PFEs 20 to be updated without degrading packet forwarding performance of routing node 10. Alternatively, routing engine 16 may derive separate FIBs which are copied to respective PFEs 20.

In a routing node, a "switch plane" is generally capable of providing a communication path between any two of PFEs 20. In this example, switch fabric 18 consists of multiple standalone switch planes 19A through 19K ("switch planes 19"). In some embodiments, each of switch planes 19 is provided by one or more switch fabric chips on one or more separate, removable switch cards. Other routing nodes that implement the techniques described herein may comprise additional or fewer switch planes, including a single switch plane. A majority of the switch planes may be active at any given time with data packets distributed over the active switch planes. The inactive switch plane(s) of switch fabric 18 serves as back-up switch plane(s) such that if one or more of the active switch planes goes offline, the back-up switch plane(s) automatically activate, and the bandwidth capacity of standalone router 10 is not diminished. The back-up switch plane(s) may be identical to the active switch planes and act as hot spare(s) to maintain bandwidth capacity in the event that one or more of the active switch planes fail. Each of switch planes 19 is operationally independent; therefore, standalone routing node 10 may continue to forward packets as long as at least one of switch planes 19 remain active, but possibly at a reduced bandwidth capacity.

As part of a standalone router, switch planes 19 form a standalone switch fabric 18. That is, each of switch planes 19 is capable of providing a connection between any of PFEs 20 within routing node 10. In this manner, switch planes 19 form a standalone switch fabric that enables packet forwarding between the plurality of PFEs 20 of routing node 10. For example, switch fabric 18 may be provided by a set of removable switch cards, where each removable switch card provides a respective one of switch planes 19.

In accordance with the techniques described herein, routing node 10 may be configured to implement fabric cell sharing. Each of PFEs 20 may be configured for fabric cell sharing, such that upon receiving incoming packets, PFEs 20 will determine whether contents of multiple packets may share a single fabric cell that is output onto and transported by internal switch fabric 18. In some embodiments, contents of only two packets may share a single fabric cell, while in other embodiments, contents of more than two packets may share a single fabric cell. As described in further detail below, the PFEs 20 maintain queues for each destination reachable through switch fabric 18, e.g., for each of the PFEs 20 or for each of a plurality of interfaces (physical or virtual) associated with each of PFEs 20. The PFEs 20 make cell sharing determinations upon enqueuing packet data and upon dequeuing the packet data.

An example flow-path of data packets through routing node 10 is as follows. Initially, an incoming data packet is received by one of packet IFCs 21, e.g., IFC 21A, having a network interface for receiving data packets from a packet-based network link, such as an Ethernet link. Interfaces on IFC 21A send packet data, such as a packet header, to a lookup module of PFE 20A for processing. The lookup module (not shown) within PFE 20A determines a destination address, multicast forwarding tuple, or other keying information of the packet from the packet data and queries a forwarding information base (FIB) for a forwarding entry matching the keying information. A matching entry specifies the appropriate next hop interface for the packet. PFE 20A stores the packet for future processing in an input buffer. The input buffer is typically a form of dynamic RAM (e.g., DRAM, SDRAM, DDR2 SDRAM, and the like) but may be another type of storage media. In some embodiments, the input buffer is shared among the various PFEs 20 of routing node 10 as distributed buffer memory. In this case, rather than packet data being transmitted across switch fabric 18 in the fabric cells, pointers to locations of the packet data in the input buffers may be what is transmitted in the fabric cells, such that the egress PFE can receive the pointers and read the data from the shared input buffer. In some embodiments, interfaces of IFCs 21 are implemented as high-speed, on-chip memory within one or more forwarding integrated circuits, and the input buffer is provided by off-chip DDR2 coupled to the forwarding integrated circuits by a data bus.

The input buffer stores network packets received by IFC 21A, that is, those packets for which PFE 20A is the ingress one of PFEs 20. As a result, packets stored in PFE 20A are fabric queued and wait for scheduling to be switched across switch fabric 18 to the appropriate one or more egress PFEs 20. PFE 20A selects a queue for enqueuing the packet based on the next hop interface determined by the lookup module. The input buffer may provide a variable-size buffer for each fabric destination.

In this example, PFE 20A divides the inbound data packet into segments corresponding to one or more fabric cells, for example, into fixed-length fabric cells that can carry up to sixty-four bytes of data. If a given data packet does not fill up the entire sixty-four bytes of a cell, PFE 20A determines whether contents of more than one packet may be shared in the remaining available space of the cell that would otherwise be wasted as the cell is communicated through switch fabric 18.

In one example, cell-sharing may be a programmable option of routing node 10 on a per-queue basis within a given PFE 20. The cell-sharing decision can be computed at two places: one in an enqueue pipeline of the PFE when sending an enqueue request to a scheduler in the PFE that controls usage of switch fabric 18 and the other in a dequeue pipeline of the PFE when dequeuing the packet data.

In one embodiment, a switch fabric may utilize fixed-length fabric cells of sixty-four bytes, where any given fabric cell may be shared on the basis of a thirty-two-byte boundary. In other words, in this example, a given sixty-four byte cell on the fabric can include data for a single packet or for two packets split along the thirty-two byte boundary. For example, if a first data packet contains sixty-five bytes of data, this data will be split across two cells, the first cell filled with sixty-four bytes of data, and the second cell having one byte of data. The second cell may also be filled with up to thirty-two bytes of data from a second data packet, where the data of the second packet resides in one thirty-two byte portion of the cell while the remaining byte from the first packet is carried in the other thirty-two byte portion of the cell. In this sense, the first data packet only takes up 1.5 data cells, rather than 2 full data cells as would be the case in the absence of the cell sharing mechanisms set forth herein. In some embodiments, the following optional features are applied by the ingress PFE 20 to further optimize and simplify cell sharing within the fabric: (1) A sixty-four byte cell can be limited to include at most one end-of-packet (EOP) and one start-of-packet (SOP); and (2) cell-sharing is done if the SOP chunk of the next packet is at least sixty-four bytes and the packet total size has to be larger than sixty-four bytes. In other embodiments, cells may be shared on the basis of other boundaries, e.g., sixteen bytes, eight bytes, and so on, for finer granularity in cell-sharing.

PFE 20A may add a cell header to the cells to be used internally when forwarding the cells through switch fabric 18. The cell header may indicate a priority of an associated packet carried by the cell, for purposes of flow control within the switch fabric. The cell header may also indicate whether the cell is a shared cell, allowing shared cells to be considered a new class of cells traversing switch fabric 18 and, therefore, be treated with a certain quality of service or flow control. The egress PFE 20 may note when a cell marked as a shared cell is received, and may process the shared cell differently than a non-shared cell with respect to queuing and quality of service.

In one example, when ingressing a packet, PFE 20A performs flow control for packet switching communications, e.g., by sending a request through switch fabric 18 to the egress PFE 20N for sending the number of cells corresponding to the packet(s). If egress PFE 20N has sufficient room in its outbound buffers, the egress PFE 20N may respond to the request with a grant signal. Upon receiving the grant, PFE 20A dequeues the fabric cell(s) containing the packet and transfers the cells of the packet across the active switch planes to the correct egress PFE, i.e., PFE 20N in this example. During this process, the active switch planes forward the packet cells to the egress PFE. When the packet cells arrive at the egress PFE, e.g., PFE 20N, the packet cells are written into egress memory and reassembled into the original data packet (s). The data packets are then transmitted into the network (not shown) via one of IFCs, e.g., IFC 21N. By dividing the data packet into cells and evenly transmitting the packet on a cell-by-cell basis across the switch planes, a PFE may load-balance the packet-based traffic across each of the active switch planes.

Control unit 12 may be implemented solely in software, or hardware, or may be implemented as combinations of software, hardware, or firmware. For example, control unit 12 may include one or more processors which execute software instructions. For example, control unit 12 may comprise a processor, such as one or more programmable processors, microprocessors, application specific integrated circuits, field programmable gate arrays, digital signal processors, or other equivalent integrated or discrete logic circuitry. Control unit 12 may comprise one or more processors that execute software instructions, such as those used to define a software or computer program, stored to a computer-readable storage medium, such as a storage device (e.g., a disk drive, or an optical drive), or memory (e.g., a Flash memory, random access memory, or RAM) or any other type of volatile or non-volatile memory that stores instructions (e.g., in the form of a computer program or other executable) to cause a programmable processor to perform the techniques described herein. Alternatively, control unit 12 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), one or more Digital Signal Processors (DSPs) or any combination of the foregoing examples of dedicated hardware, for performing the techniques described herein.

Figure 3:
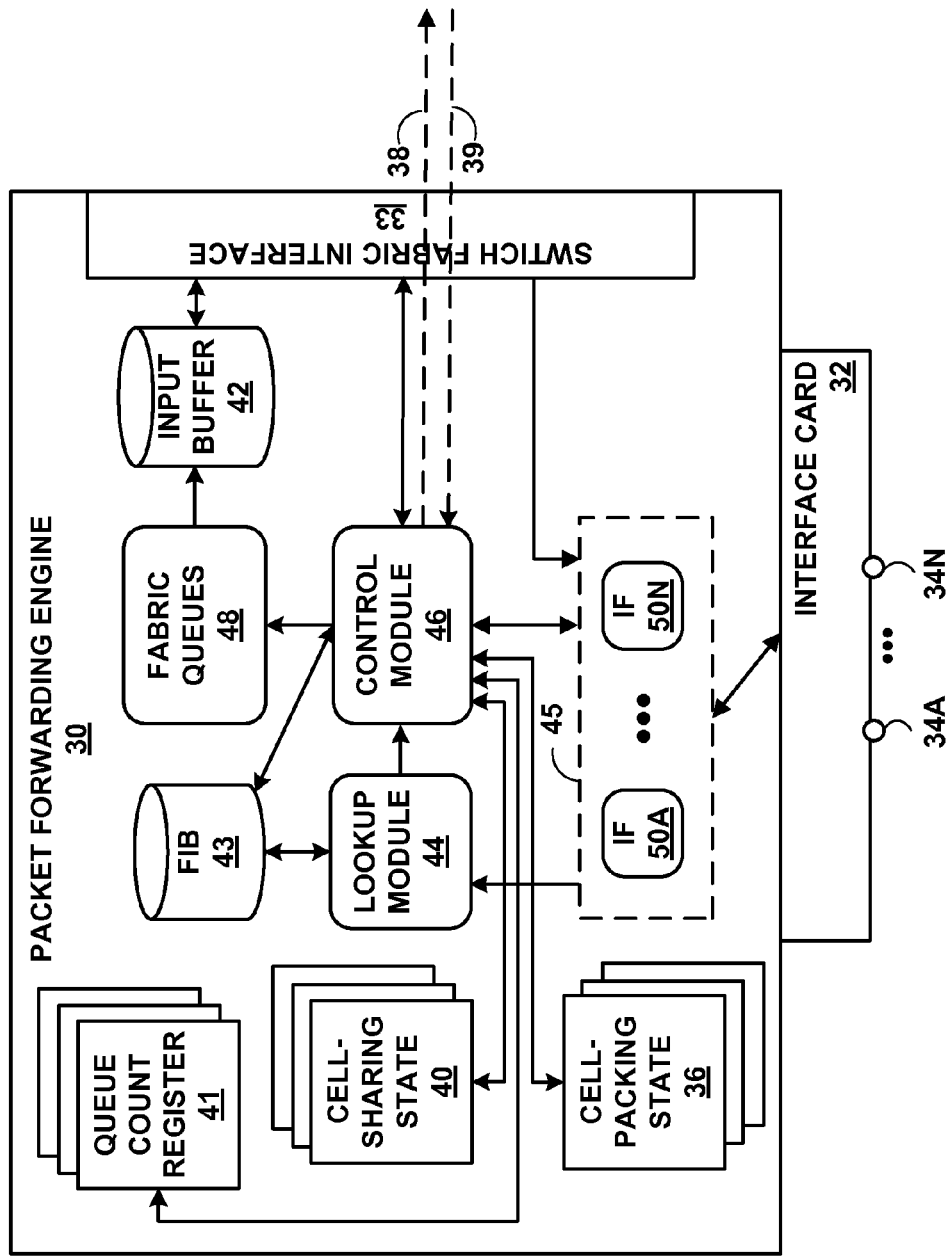
FIG. 3 is a block diagram illustrating, in greater detail, an interface card and packet forwarding engine that implement the cell sharing techniques described above to improve router throughput.

FIG. 3 is a block diagram illustrating, in greater detail, an example interface card 32 and an example PFE 30 that implement the cell sharing techniques described above to improve router throughput. Interface card 32 and PFE 30 may be similar to IFCs 21 and PFEs 20 of routing node 10 of FIG. 2. In this example, PFE 30 comprises interface card 32 that includes physical network interfaces 34A-34N (collectively, interfaces 34). Interfaces 34 couple PFE 30 to other network devices in a network via network links (not shown in FIG. 3) to enable PFE 30, and thereby the router in which PFE 30 resides, to exchange network packets with the coupled network devices.

PFE 30 further includes resources 45 for storing, replicating, and forwarding packets. Resources 45 may comprise, for example, one or more data structures, memory space in a memory device such as a static RAM (SRAM), components of a general- or special-purpose processor, integrated circuitry, or other such resources for storing, replicating, and/or forwarding packets. Although illustrated independently, resources 45 may be integrated with one or more other components of PFE 30. For example, control module 46 may comprise resources 45 in the form of on-chip SRAM.

Resources 45 include interfaces 50A-50N ("interfaces 50"). Interfaces 50 are associated with interfaces 34A-34N (e.g., physical interfaces). PFE 30 may implement interfaces 50 in a memory device, such as on-chip static RAM (SRAM), or another type of memory or storage device. Network packets may be received from, forwarded to, or offloaded to any of interfaces 50 in a similar manner to that of interfaces 34. As an example, forwarding information entries may identify one of interfaces 50 as a next hop interface. In this way, routing node 10 may use interfaces 50 as identifiers to internally route network packets among PFEs 30.

As described in detail below, in one example, PFE 30 implements fabric queues 48. In some embodiments, the fabric queues 48 may have a scarce amount of buffering capacity for next hop interfaces at egress PFEs; rather, packets are initially buffered at the ingress ones of PFEs 30. PFE 30, for instance, may implement interfaces 50 using on-chip SRAM. Because SRAM is typically expensive, memory space for PFE 30 may be limited. Accordingly, PFE 30 allocates a shallow buffer for interfaces 50. In example PFE 30, each of interfaces 50 has sufficient buffering capacity for one network packet. In some embodiments, PFE 30 may have additional, limited buffering capacity for additional packets. In some embodiments, PFE 30 may implement interfaces 50 in off-chip memory such as that comprised by input buffer 42.

PFE 30 further comprises switch fabric interface 33, forwarding information base 43 ("FIB 43"), and lookup module 44. Switch fabric interface 33 provides an interface to switch fabric (not shown in FIG. 3) that allows PFE 30 to exchange commands and data with other PFEs 30 on routing node 10. FIB 43 comprises forwarding information to control the forwarding of packets by routing node 10. As one example, FIB 43 includes forwarding entries for destination network devices having specific destination Internet Protocol (IP) addresses. As one example, FIB 43 is organized as a radix tree that maps a particular destination address to a next hop and ultimately to one or more interfaces 34 of routing node 10. For example, an entry in FIB 43 may map the destination address for router 4 of system 2, having destination address $D_1$, to interface 34A. As another example, the forwarding information of FIB 43 may map multiprotocol label switching (MPLS) labels, virtual local area network (VLAN) tags, multicast forwarding tuple, or any other type of keying information that can be obtained from a packet or other data unit and used to map the packet to an appropriate next hop.

Lookup module 44 determines, for a particular packet, the appropriate next hop interface for the packet on routing node 10. Interfaces 34 on interface card 32 and interfaces 50 send packet data, such as a packet header, to lookup module 44 for processing. Lookup module 44 determines the destination address, multicast forwarding tuple, or other keying information of the packet from the packet data and queries FIB 43 for a forwarding entry matching the keying information. A matching entry specifies the appropriate next hop interface for the packet.

PFE 30 further comprises input buffer 42, fabric queues 48, and control module 46. Input buffer 42 buffers network packets received by interfaces 34. In other words, when PFE 30 is an ingress one of PFEs 30 for a packet, PFE 30 stores the packet for future processing. Input buffer 42 is typically a form of dynamic RAM (e.g., DRAM, SDRAM, DDR2 SDRAM, and the like) but may be another type of storage media. In some embodiments, input buffer 42 is shared among the various PFEs 30 of routing node 10 as distributed buffer memory. In some embodiments, interfaces 50 are implemented as high-speed, on-chip memory within one or more packet forwarding integrated circuits, and input buffer 42 is provided by off-chip DDR2 coupled to the packet forwarding integrated circuits by a data bus.

Each of fabric queues 48 may operate as an fabric queue for queuing packets (e.g., by storing packet data or pointers to packet data) for transmission through the switch fabric to a different egress PFE. In some embodiments, packet references (also called "chunk pointers") are enqueued, while in other embodiments, packet data itself (chunks) are enqueued. A packet reference is a reference to the memory location of the packet as stored in the input buffer 42 address space, e.g., a pointer. For simplicity, the techniques are generally described herein with reference to enqueuing chunks. Fabric queues may in some embodiments be considered virtual output queues in that each queue buffers data on behalf of a corresponding egress PFE as if the queue were physically located at that egress PFE. Input buffer 42 stores network packets received by interfaces 34A, that is, those packets for which PFE 30 is the ingress one of PFEs 30. As a result, packets stored in PFE 30 are fabric queued and wait for scheduling to be switched across switch fabric 18 to the appropriate one or more egress PFEs 30. In some instances, two different ones of PFEs 30 may receive packets both having an outbound interface associated with a single one of PFEs 30. If packets enqueued for switching are held in a single queue, this may force one of the receiving ones of PFEs 30 to block until the other receiving one of PFEs 30 has switched its respective packet. Virtual output queuing may enable switch fabric 18 to maintain a high throughput despite such blocking.

Control module 46 is a hardware and/or software module executed on hardware that manages the flow of data and metadata for PFE 30. To enable fabric queuing, control module 46 manages packet data in fabric queues 48 and schedules fabric requests into switch fabric 18. Fabric queues 48 may include a set of N fabric queues that correspond to each of the PFEs 30 of routing node 10. In an example routing node 10, fabric queues 48 comprises N=4 fabric queues. After lookup module 44 determines a next hop interface for a packet received by one of interfaces 34A, control module 46 enqueues portions of a packet, i.e., chunks. More particularly, control module 46 enqueues the packet chunks in the one of fabric queues 48 that corresponds to the one of PFEs 30 that contains the next hop interface for the packet. In this way, each of the fabric queues 48 may be assigned to one of the PFEs reachable through the switch fabric and operates as a queue to the switch fabric for queuing the packets prior to transmitting the packets through the switch fabric in the form of the fabric cells. In various aspects, the pointers may be stored in an off-chip memory, e.g., an RLDRAM memory, or an on-chip memory, e.g., an SRAM-based link memory.

Each of fabric queues 48 receives chunks from packets destined for the corresponding ones of PFEs 30 and maintains those chunks in the order that they were received. In this manner, each of fabric queues 48 implements the characteristic first-in-first-out (FIFO) functionality of a queue data structure. In some embodiments, fabric queues 48 may be partitioned into priority levels to enable quality of service guarantees for routing node 10. There may be an N-to-one relationship between queues and PFEs, such that there are multiple "fabric destinations" defined for a single PFE, with each fabric destination being associated with one of fabric queues 48. For example, fabric queues 48 may comprise eight fabric queues, corresponding to eight different network traffic priority levels, for each of the PFEs 30 of routing node 10. In some embodiments, fabric queues 48 include fabric queues for each of the individual interfaces of PFEs 30. In some embodiments, switch fabric 18 may multiplex cells from multiple ones of fabric queues 48 to a single fabric destination.

Control module 46 schedules packets having chunks held by fabric queues 48 for transmission to one of the next hop interfaces associated with PFE 30 or another PFE of the routing node according to a scheduling algorithm. Control module 46 may implement a scheduling algorithm that maximizes the switch fabric 18 throughput and, concomitantly, the packet throughput of routing node 10. Upon scheduling a packet, control module 46 generates and sends one or more interface access requests to the one or more of PFEs 30 that include the next hop interfaces. Interface access requests (also referred to herein as "fabric requests") include an identifier specifying the one of the interfaces requested as the next hop interface.

Control module 46 is enhanced to implement the techniques of the disclosure by determining whether a fabric cell can be shared by contents of more than one packet. As illustrated in FIG. 3, PFE 30 further includes cell-sharing state 40, queue count register 41, and cell-packing state 36. Control module 46 may use cell-sharing state 40 and cell-packing state 36 for keeping track of fabric cells that have been filled and/or partially filled and which may be candidates for cell sharing. Cell-sharing state 40 indicates whether a most recent packet enqueued in one of fabric queues 48 is a candidate for cell-sharing. Cell-sharing is enabled on a per-fabric destination basis, such that packets may share a cell when they are destined for the same fabric destination. As PFE 30 maintains a fabric queue 48 for each fabric destination, control module 46 may enable cell sharing on a per-queue basis. PFE 30 may therefore maintain separate cell-sharing state 40 for each of fabric queues 48. As one example, an administrator may program PFE 30 to set whether cell-sharing is enabled for each fabric destination. The administrator may also configure PFEs 30 with a specified cell-sharing boundary for each queue, e.g., thirty-two bytes, sixteen bytes, and the like. The administrator may configure different queues with different cell-sharing boundaries.

In operation, to perform switching for a packet received by PFE 30, control module 46 requests lookup module 44 to query FIB 43 for a forwarding entry that keys to the data identifying the packet. Upon receiving from FIB 43 a matching entry having a next hop interface for the packet, control module 46 stores the packet to input buffer 42 and places chunks for the packet in the one of fabric queues 48 that corresponds to the next hop interface. At the time of enqueuing the pointers, control module 46 may examine the chunk for the packet to determine whether the chunk can share a fabric cell with data from a second packet. Control module 46 may keep track of the packet size by adding up the byte count in the individual chunks, and when the enqueue logic determines that a full fabric cell worth of data is enqueued (e.g., sixty-four bytes), control module 46 increments a queue count register 41 that keeps a count of the number of fabric cells associated with the queue.

Control module 46 generates and sends fabric requests to the PFE that contains the next hop interface for the packet, i.e., the egress PFE. For example, for every 64B in the packet size so far accumulated, control module 46 may send a scheduler enqueue request on the selected interface 50. In some embodiments, next hop interface data for a packet is transmitted and stored together with the packet data, e.g., in a packet header. In such embodiments, control module 46 may query the associated next hop interface data to determine the appropriate next hop interfaces for a packet. The example shown in FIG. 3 illustrates a fabric request 38 generated by control module 46, and a fabric grant 39 received by control module 46. After sending a request, in some embodiments, control module 46 computes the packet size modulo sixty-four, and the result is kept in cell-packing state 36. Control module 46 repeats this process for every chunk for the current packet. Even when a full fabric cell worth of data may not have been enqueued, the queue count register 41 is also incremented when an end-of-packet is enqueued.

As described in further detail below, enqueue logic of control module 46 determines cell-sharing at the packet's end-of-packet (EOP) by checking various conditions to determine whether cell-sharing is possible for this EOP. If cell-sharing is possible, the cell-sharing state 40 is set to reflect that cell-sharing is possible for the packet most recently added to the queue. If cell-sharing is not possible, cell-sharing state 40 remains at the default value that indicates cell-sharing is not possible for the most recent packet in the queue. When a subsequent chunk of packet data from a second packet that includes a start-of-packet (SOP) is received for this queue, control module 46 checks certain conditions to determine whether cell-sharing state 40 indicates cell-sharing is possible and whether the SOP packet chunk is a candidate for cell-sharing. If so, control module 46 will plan to share the cell among the packet data that includes the EOP of the first packet and the SOP of the second packet.

Alternatively, rather than maintaining explicit cell-sharing state 40, control module 46 may determine whether cell-sharing is possible for a most recent packet in a queue based on analysis of the queue without reference to explicit cell-sharing state. For example, if no packets are present in the queue at a given time, then cell-sharing is clearly not possible for a most recent packet in the queue at that time. Control module 46 may determine indirectly by looking at the queue whether cell-sharing is possible when there are packets in the queue.

When PFE 30 is acting as an egress PFE rather than an ingress PFE, control module 46 may receive fabric requests from an ingress PFE via switch fabric interface 33. As the egress, PFE 30 services fabric requests, allocates sufficient buffer space to account for the worst-case single-cell packets which can return, and sprays the fabric grants back to the ingress PFE. Specifically, when PFE 30 is the egress PFE, control module 46 manages access to interfaces 50 for other PFEs 30 of the router that are attempting to switch packets to PFE 30 for delivery to these interfaces as next hop interfaces. Control module 46 receives, via switch fabric interface 33, fabric requests from other PFEs 30 that have packets requiring access to interfaces 50.

Control module 46 may grant access to the requested one of interfaces 50 when the requested interface comprises sufficient resources to receive the packet for which access is sought. When the requested interface does not comprise sufficient resources, control module 46 may deny the access request. In some embodiments, control module 46 automatically grants a previously denied access request when the requested one of interfaces 50 becomes available. Such embodiments may include a queue (not shown) for each of interfaces 50 that enqueues fabric requests. Control module 46 dequeues fabric requests as the associated one of interfaces 50 becomes available.

When interfaces 50 is available, control module 46 sends a fabric grant to the ingress PFE to signify capacity in the one of interfaces 50 for the packet. As the egress PFE, no change is needed to PFE 30 for servicing fabric requests and generating fabric grants, because cell-sharing does not present additional constraints beyond the situations that the algorithm already has to account for. Cell-sharing does not change the minimum or maximum number of bytes delivered per fabric cell.

As the ingress PFE, upon receiving the fabric grant, dequeuing logic of control module 46 makes a symmetric cell-sharing decision using the same criteria as was used by the enqueuing logic to determine whether a single fabric cell should be shared by contents of multiple packets. For example, the dequeuing logic may determine whether a portion of a first packet containing an EOP can be shared with a portion of a second packet containing a SOP. PFE 30 sends the fabric cells carrying the packet to the egress PFE via switch fabric interface 33. Shared fabric cells may be marked as such. In some embodiments, the fabric cells further include forwarding information that specifies next hops, from the egress PFE, for the packet.

When the egress PFE receives the fabric cells, the data payloads are written to memory, e.g., on-chip SRAM. The egress PFE will also place back in order those fabric cells which have been re-ordered during transmission over the switch fabric.

Figure 4A:
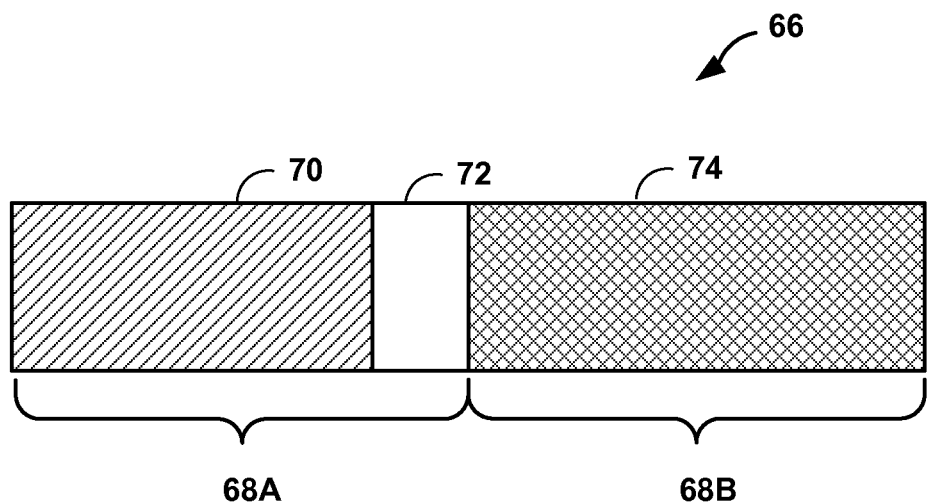
FIGS. 4A-4B are block diagrams illustrating example fabric cells that may be formatted for sharing along different cell-sharing boundaries.

FIG. 4A is a block diagram illustrating a data payload of an example shared fabric cell 66 that is formatted for sharing along a thirty-two byte cell-sharing boundary. An additional cell header which may be applied to the fabric cell 66 by a PFE is not shown in FIG. 4A. Fabric cell 66 is a sixty-four byte fabric cell, and is divided into two thirty-two byte portions 68A and 68B. In some aspects, each of the portions 68A and 68B may contain contents from at most one packet. In some cases, both of the portions 68A and 68B may contain bytes from the same packet, i.e., when the packet contains greater than thirty-two bytes of data. In other cases, such as the one illustrated in FIG. 4A, the portions 68A and 68B contain contents of different packets. In FIG. 4A, portion 68A of fabric cell 66 is filled with twenty-six bytes of data 70 from a first packet, with the remaining six bytes of data of portion 68A as unutilized data space 72. Portion 68B of fabric cell 66 is filled with thirty-two bytes of data 74 from a second packet. Shared fabric cell 66 is transmitted across a switch fabric, such as switch fabric 18 of FIG. 2. In the example of FIG. 4A, certain restrictions may be applied for cell-sharing on a thirty-two byte boundary. For example, cell sharing may be performed only when a packet is larger than sixty-four bytes, and a sixty-four byte cell shared on a thirty-two byte boundary can have at most one end-of-packet (EOP) and start-of-packet (SOP).

Figure 4B:
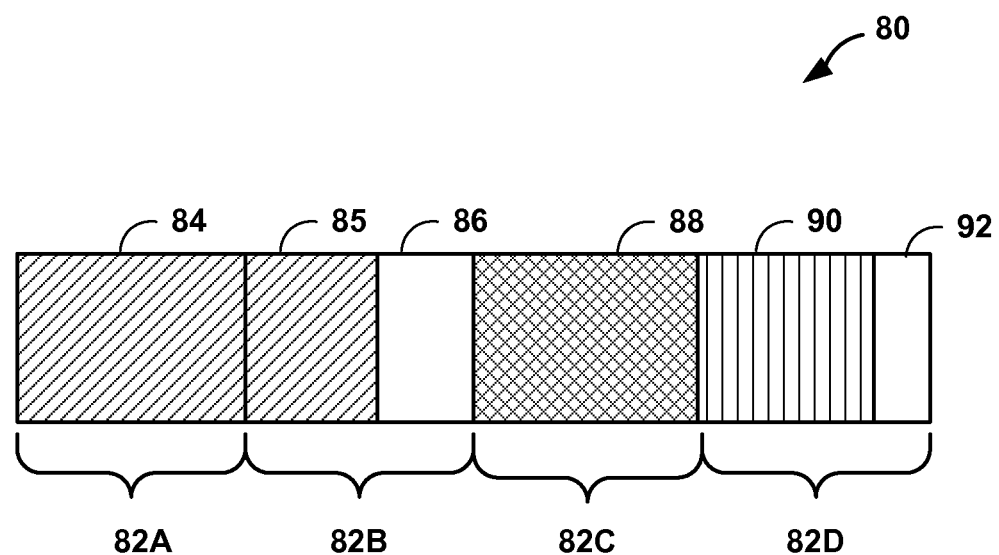

FIG. 4B is a block diagram illustrating a data payload of an example shared fabric cell 80 that is formatted for sharing along a sixteen byte cell-sharing boundary. Fabric cell 80 is a sixty-four byte fabric cell, and is divided into four sixteen byte portions 82A-82D ("portions 82"). In some aspects, each of the portions 82 may contain contents from at most one packet. In some cases, more than one of the portions 82 may contain bytes from the same packet, i.e., when the packet contains greater than sixteen bytes of data. In other cases, such as the one illustrated in FIG. 4B, certain of portions 82 contain contents of different packets. In FIG. 4B, portion 82A of fabric cell 80 is filled with sixteen bytes of data 84 from a first packet, and portion 82B is filled with an additional ten bytes of data 85 from the first packet. The remaining six bytes of portion 82B are unutilized data space 86. Portion 82C of fabric cell 80 is filled with sixteen bytes of data 88 from a third packet. Portion 82D of fabric cell 80 is filled with twelve bytes of data 90 from a fourth packet, and four bytes worth of data space 92 in portion 82D are unutilized. Shared fabric cell 66 is transmitted across a switch fabric, such as switch fabric 18 of FIG. 2.

Figure 5:
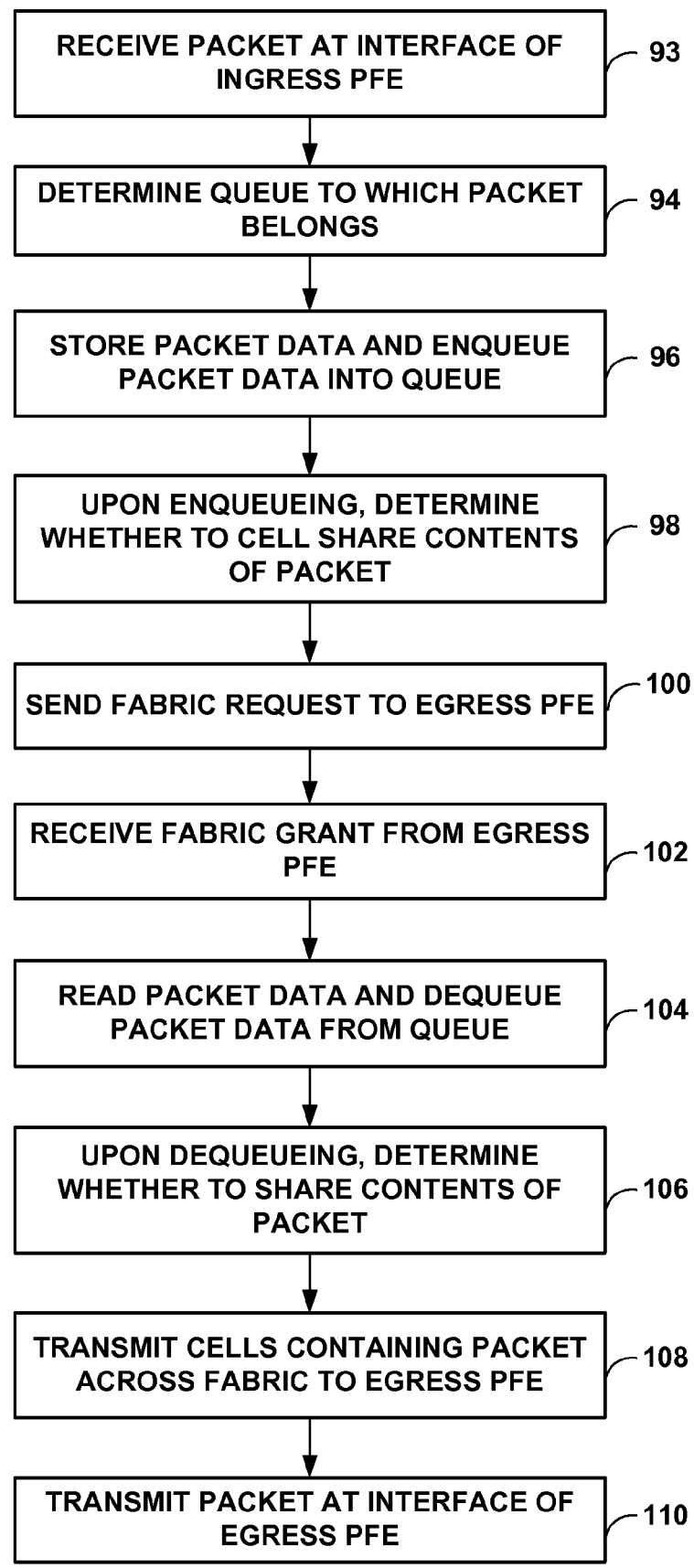
FIG. 5 is a flowchart illustrating example operation of a router in implementing the packet-switching techniques disclosed herein.

FIG. 5 is a flowchart illustrating example operation of a router, such as routing node 10 of FIG. 2, in implementing the packet-switching techniques disclosed herein. Routing node 10, for example, receives a packet on an interface associated with a PFE of routing node 10, e.g., on IFC 21A of PFE 20A (93). Lookup module 44 determines keying information for the packet from packet data, and queries FIB 43 for a forwarding entry matching the keying information. A matching entry specifies the appropriate next hop interface for the packet associated with an egress PFE, i.e., one of interfaces 50.

Based on the next hop interface for the packet, control module 48 selects one of fabric queues 48 corresponding to the next hop interface (94). Control module 48 enqueues the packet in the appropriate fabric queue 48 (96). Upon determining an egress PFE 20 for the packet and enqueuing the packet in a queue associated with the egress PFE, PFE 20A determines whether to share in a single fabric cell contents of the packet with contents of another packet (98). The process for making the cell-sharing decision is described in further detail below. PFE 20A sends a fabric request onto switch fabric 18 to the egress PFE, e.g., PFE 20N (100). In response to the fabric request, PFE 20A receives a fabric grant from PFE 20N via switch fabric 18 (102). PFE 20A reads the packet data and dequeues the packet data from the queue for PFE 20N (104). Upon dequeuing the packet from the queue for PFE 20N, PFE 20A determines whether to share in a fabric cell contents of the packet with contents of another packet, as described below (106). PFE 20A then transmits the fabric cells across switch fabric 18 to the egress PFE 20N (108). Egress PFE 20N receives the fabric cells via switch fabric 18 and transmits the packet data as a packet at an interface of egress PFE 20N (110).

Figure 6A:
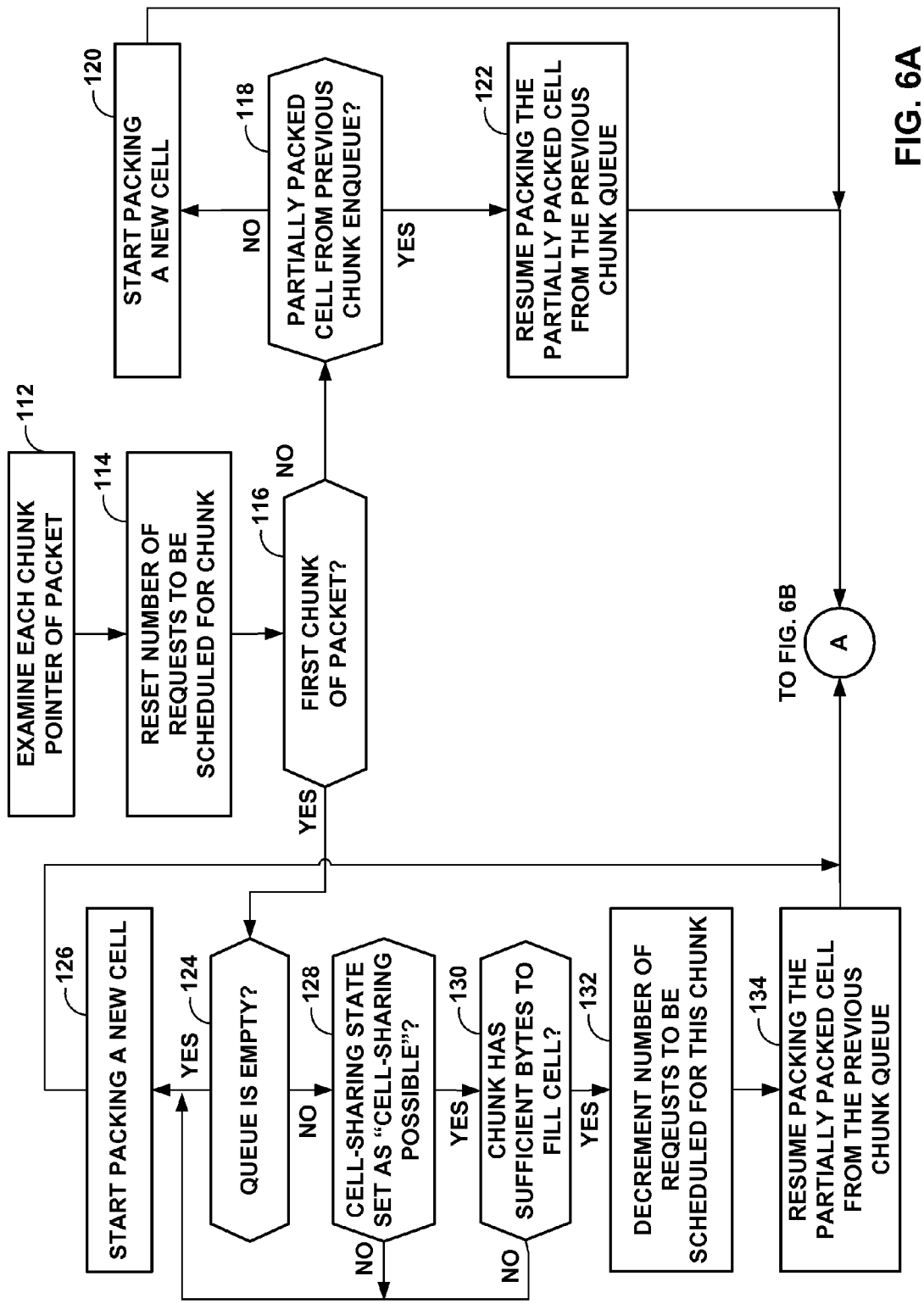
FIGS. 6A-6B are flowcharts illustrating example operation of a router in further detail in implementing the enqueuing mechanisms disclosed herein.
Figure 6B:
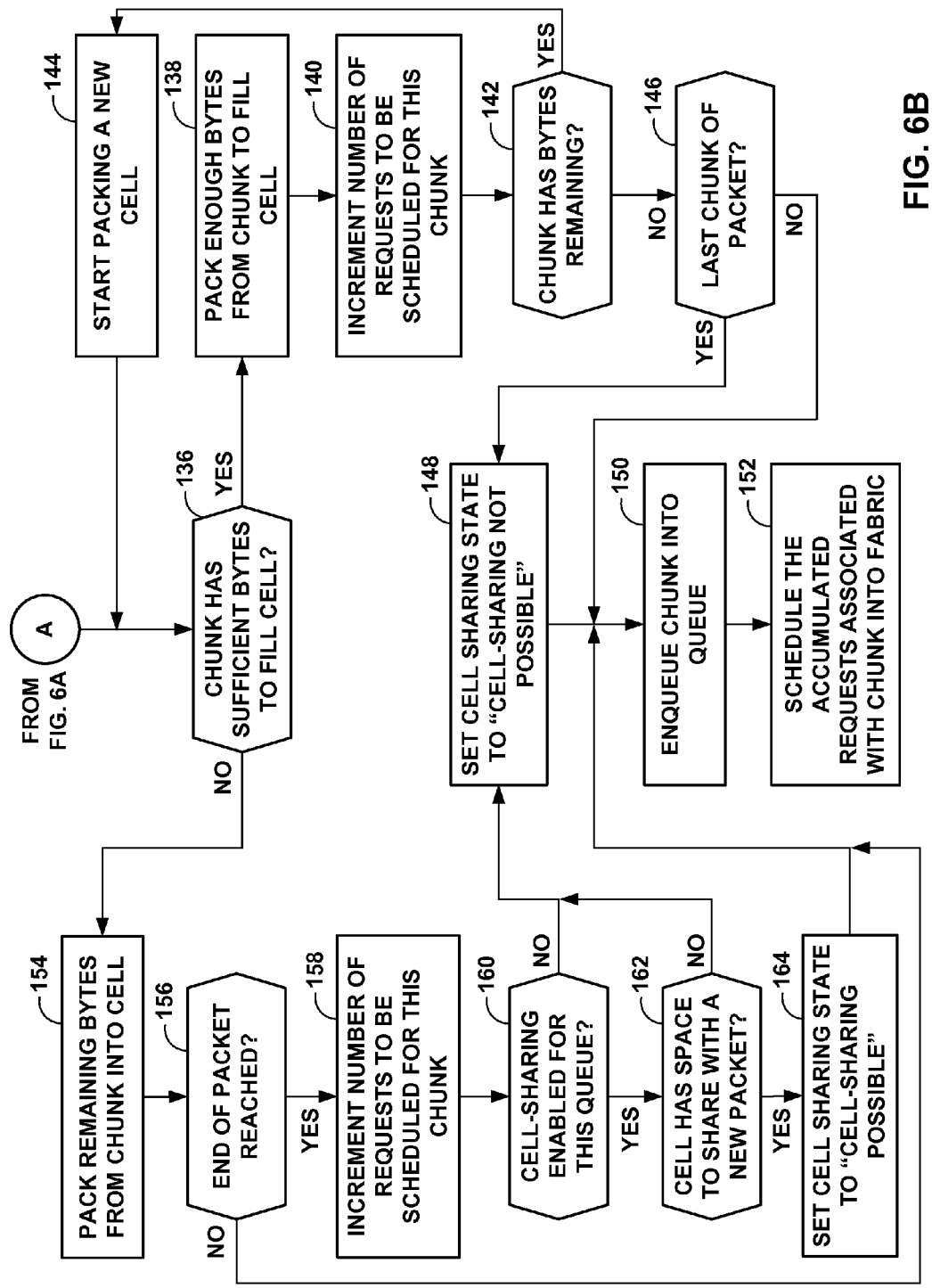

FIGS. 6A-6B are flowcharts illustrating example operation of a router in implementing a cell-sharing determination on the enqueuing side, such as routing node 10 (FIG. 2) or one of edge routers 5 or router 4 (FIG. 1). FIGS. 6A-6B are described based on FIGS. 1-3, and a sixty-four byte cell with a thirty-two byte cell-sharing boundary is used as an example. As explained, control unit 48 enables cell-sharing on a per-fabric destination basis, i.e., a per-queue basis.

When packets are received, the packets may be divided into chunks of data. In the example of FIGS. 6A-6B, packet data is enqueued on a chunk-by-chunk basis, and requests to transmit cells associated with a single chunk across the switch fabric are sent together for that chunk. The enqueue process determines how many fabric cell requests are to be scheduled into the fabric. The enqueue process may begin with a number of fabric cell requests to be scheduled for a given packet as zero. Each chunk may have variable size, though there may be a maximum chunk size.

Control module 46 of PFE 30 examines a given chunk being enqueued (112) and resets a number of requests to be scheduled for the chunk, e.g., to zero (114). If the chunk is not the first chunk of a packet (NO branch of 116), control module 46 determines whether there is a partially packed cell from the previous chunk that was enqueued (118). Control module 46 determines this based on cell-packing state 36, which is state information maintained on a per queue basis, that indicates whether there is a partially packed cell, and how many bytes have been packed (i.e., indicating where to resume packing). Control module 46 refers to this state at chunk boundaries. If control module 46 determines that a partially packed cell from a previous chunk enqueue is not available (NO branch of 118), control module 46 starts packing the chunk to a new cell (120). If control module 46 determines that a partially packed cell from a previous chunk enqueue is available, control module 46 packs the current chunk into the partially packed cell (122).

If control module 46 determines that the chunk being examined is the first chunk of the packet (YES branch of 116), control module 46 checks whether the fabric queue 48 to which the packet belongs (as determined in step 94 of FIG. 5) is empty (124). If the queue is empty (YES branch of 124), control module 46 starts packing a new cell with the chunk (126). For example, even if a partially packed cell was present in the queue previously that was eligible for cell sharing, if a new cell was not received before the cell was dequeued, the queue will then be empty when the next packet is received.

If control module 46 determines that the queue is not empty (NO branch of 124), control module 46 checks whether cell-sharing state 40 associated with the queue is set to "cell-sharing possible," i.e., whether the previous chunk enqueue operation decided that it was possible to cell share (128). If not, control module 46 starts packing a new cell with the chunk (126). In the example of FIG. 6A, if control module 46 determines that cell-sharing is possible for the queue, control module 46 determines whether the chunk has sufficient bytes to fill the cell (130), and if not, control module 46 starts packing a new cell with the chunk (126). The amount of bytes needed to fill the cell depends on the size of the cell-sharing boundary in the given implementation. If control module 46 determines that the chunk does have sufficient bytes to fill the cell (YES branch of 130), control module 46 has, in effect, determined that the cell may be shared, and control module 46 will decrement the number of requests to be scheduled for this chunk by one (132), and resume packing the partially packed cell (from the previous chunk enqueue) with the current chunk (134). Control module 46 decrements the number of requests for book-keeping purposes because control module 46 had previously scheduled the request for this shared cell when the previously enqueued chunk in this cell was enqueued. Otherwise, the increment which follows in FIG. 6B (block 140) would cause another request to be scheduled for the cell.

The requirement that the chunk needs sufficient bytes to fill the cell (step 130) may be included in some embodiments to simplify the algorithm, although in other embodiments, this requirement may be omitted. In embodiments where there is no requirement that the chunk needs sufficient bytes to fill the cell, if the chunk does not have sufficient bytes to fill the cell, the chunk may be packed into the shared cell, and then the next chunk may be looked at to determine whether it is a candidate for cell-sharing, and so on.

Turning to FIG. 6B, whether control module 46 is packing a new cell or packing a partially packed cell, control module 46 determines whether the chunk has sufficient bytes to fill the bytes remaining in the cell (136). For example, if the cell is a shared cell of size sixty-four bytes with thirty-two-byte cell-sharing alignment, and the chunk being examined is the first chunk of a packet (i.e., the previously enqueued chunk already packed in the cell is from a different packet) this requires that the current chunk has at least thirty-two bytes, to fill the second half of the cell. If the cell is a shared cell and this is the first chunk of a packet, this determination may be the same determination that is made in step 130 of FIG. 6A. If the chunk being examined is not the first chunk of a packet (i.e., the previously enqueued chunk already packed in the cell is from the same packet as the current chunk), then the question of whether the current chunk has sufficient bytes to fill the remaining available space will look at the difference between the size of the cell and the amount of bytes already filling the cell from the previous chunk enqueue. For example, if the cell is a shared cell of size sixty-four bytes and the previously enqueued chunk data is of size 10 bytes, then control module 46 will determine whether the current chunk has at least 54 bytes, which would be used to fill the cell. If, for example, the cell is a new cell (not partially packed) of size sixty-four bytes, whether the chunk has sufficient bytes to fill the space available in the cell means whether the chunk has at least sixty-four bytes.

If control module 46 determines that the chunk has sufficient bytes to fill the cell (YES branch of 136), control module 46 packs enough bytes from the chunk to fill the cell (138), increments by one the number of requests to be scheduled for this chunk (140). If the chunk has more bytes remaining (YES branch of 142), control module 46 will start packing a new cell with chunk (144). Control module 46 continues with steps 136-144 until there are no bytes remaining in the chunk (NO branch of 142) or until there are no longer sufficient bytes in the chunk to fill a new cell (NO branch of 136). In the form case, if the chunk is the last chunk of the packet (YES branch of 146), control module 46 sets the cell-sharing state 40 for the queue to "cell-sharing not possible" (148), enqueue the chunk into the queue (150), and schedule the accumulated requests associated with the chunk into the fabric (152). If the chunk is not the last chunk of the packet (NO branch of 146), control module 46 does not have to update the cell-sharing state, but can proceed to enqueue the chunk into the queue (150), and schedule the accumulated requests associated with the chunk into the fabric (152).

If the chunk does not have sufficient bytes to fill the cell (NO branch of 136), control module 46 packs the remaining bytes from the chunk into the cell (154), and determines whether the end of the packet has been reached (108). If not, the cell is a partially packed cell. Control module 46 does not increment the number of requests to be scheduled, because the cell has not yet been filled (and may yet be filled with the next chunk), but simply enqueues the chunk into the queue (150).

As one example, where the chunk has 96 bytes and the cell size is sixty-four bytes, the chunk has sufficient bytes to fill the cell (YES branch of 136), and control module 46 increments by one the number of requests to be scheduled for the chunk (140). The chunk has thirty-two bytes remaining (YES branch of 142), so control module 46 starts packing a new cell. The thirty-two remaining bytes of the chunk are not sufficient to fill the next cell (NO branch of 136), and this is not the last chunk of the packet (NO branch of 156), so control module 46 does not increment the number of requests, and so you end up with a thirty-two-byte partially packed cell. For this chunk, then, control module 46 ends up with one request to be scheduled into the fabric, and one partially packed cell. Then control module 46 inspects the next chunk in the packet and goes through the process again.

If the chunk being inspected includes the end of packet (YES branch of 156), control module 46 increments by one the number of requests to be scheduled for this chunk (158) and checks whether cell-sharing is enabled for this queue (160). If cell-sharing is not enabled for the queue (NO branch of 160), control module 46 sets the cell-sharing state 40 for the queue to "cell-sharing not possible" (148). If cell-sharing is enabled for the queue (YES branch of 160), control module 46 determines whether the cell has space to share with a new packet (162). If the cell has space to share with a new packet, control module 46 sets the cell-sharing state to "cell-sharing possible" (164), enqueues the chunk into the queue (150), and schedules the accumulated requests associated with the chunk into the fabric (152). If the cell does not have space to share with a new packet, control module 46 sets the cell-sharing state 40 for the queue to "cell-sharing not possible" (148), enqueues the chunk into the queue (150), and schedules the accumulated requests associated with the chunk into the fabric (152).

For example, for a thirty-two-byte aligned cell-sharing, if the last chunk of the packet was a forty byte chunk, then the cell does not have space to share with a new packet because both of the available thirty-two-byte sections of the cell are filled with data from a different packet than the new packet. As another example, if the cell-sharing alignment is sixteen bytes, we can still start the second packet at the forty-eight byte, so the cell does have space to share with a new cell, so control module 46 sets the cell-sharing state to "cell-sharing possible."

Figure 7:
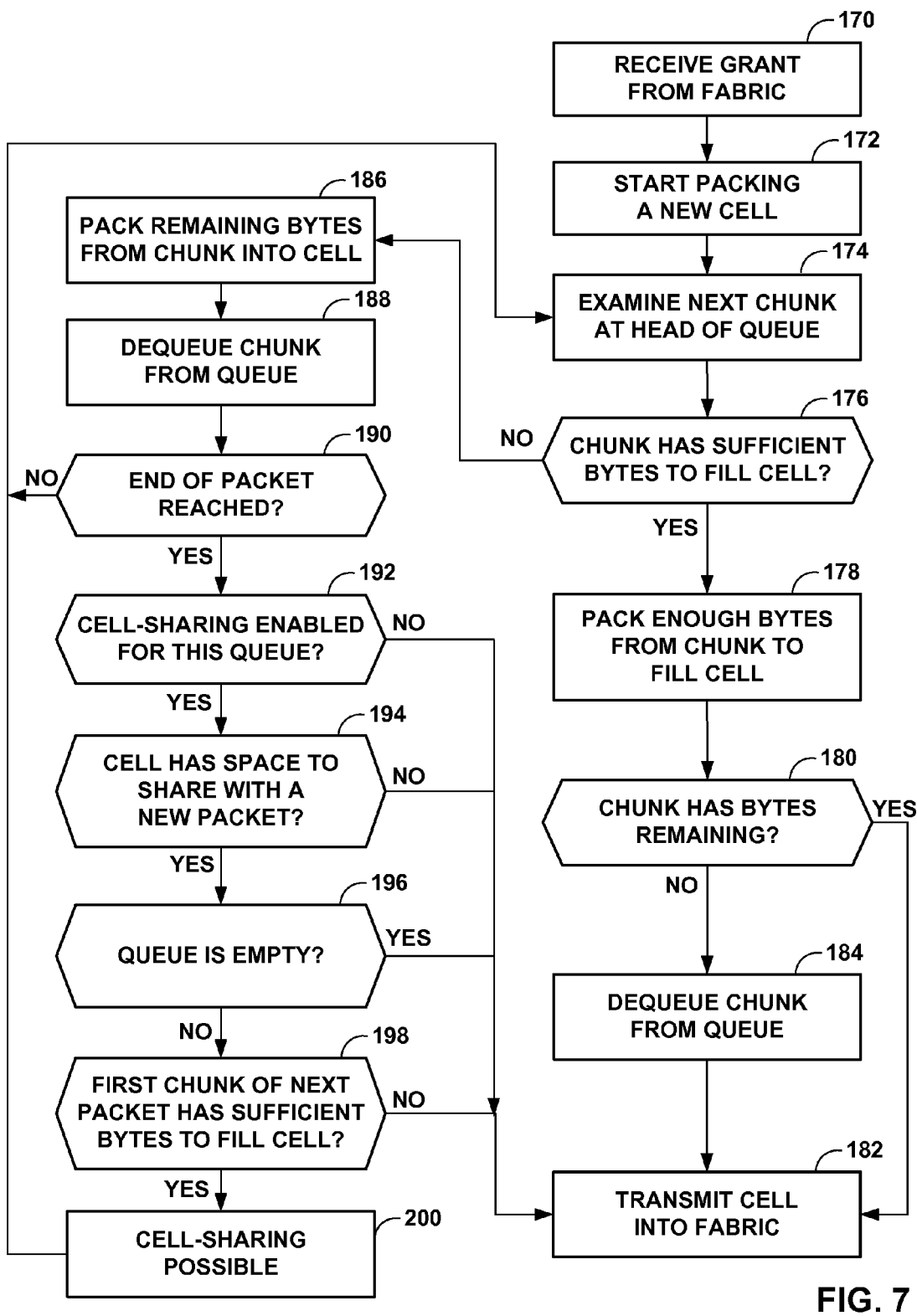
FIG. 7 is a flowchart illustrating example operation of a router in further detail in implementing the dequeuing techniques disclosed herein.

FIG. 7 is a flowchart illustrating example operation of a router in implementing a cell-sharing determination on the dequeuing side in the ingress PFE. The dequeue operation is performed on a grant-by-grant basis (which essentially considers one cell at a time). Each scheduler enqueue request having been output by control module 46 eventually results in a corresponding grant being returned by the destination PFE over the switch fabric and received by PFE 30 via switch fabric interface 33. A grant from a destination permits the next fabric cell in the queue associated with the destination to be dequeued and transmitted to the granting destination, and indicates that there should be sufficient bandwidth available in the switch fabric to accommodate the fabric cell as well as buffer space and processing power to process the fabric cell at the egress PFE. During a dequeue process, when control module 46 makes the cell-sharing decision upon seeing an EOP chunk, control module 46 inspects two chunks to make the cell-sharing decision. The first chunk is the EOP at issue, and the second one is the next SOP chunk in the queue.

When a grant is received via the fabric from a fabric destination (170), control module 46 starts packing a new cell (172) and examines the next chunk in the fabric queue 48 corresponding to the fabric destination (174). The dequeue logic of control module 46 determines whether the chunk has sufficient bytes to fill the cell (176). If so, control module 46 packs enough bytes from the chunk to fill the cell (178). If the chunk has bytes remaining after the cell is filled (YES branch of 180), control module 46 transmits the cell into the fabric (182) but does not dequeue the chunk yet, as there are still bytes that will be used to fill the next cell. If the chunk does not have bytes remaining after the cell is filled (NO branch of 180), control module 46 dequeues the chunk from the queue (184) and transmits the cell into the fabric (182). As an example, if the chunk has exactly sixty-four bytes remaining and the cell size is sixty-four bytes, control module 46 will pack the cell with the bytes of the chunk, dequeue the chunk from the queue, and transmit the cell into the fabric.

If the chunk does not have sufficient bytes to fill the cell (NO branch of 176), control module 46 packs the remaining bytes from the chunk into the cell (186), and control module 46 dequeues the chunk from the queue (188). Control module 46 checks whether the cell includes the end of packet (190). If it is not the end of packet (NO of 190), then control module 46 continues by examining the next chunk for this packet at the head of the queue (174), and proceeds through the steps again, continuing to fill the now partially packet cell.

When control module 46 again reaches the determination of whether the chunk contains the end of packet (190), and when control module 46 determines that the chunk does contain the end of packet (YES of 190), control module 46 determines whether cell-sharing is enabled for this queue (190). If so, control module 46 determines whether the cell has space to share with a new packet (194). If the cell does have space, control module 46 determines whether the queue is empty (196). If the queue is not empty (NO of 196), control module 46 determines whether the first chunk of the next packet has sufficient bytes to fill the cell (198). If so, control module 46 determines that it is possible to share the cell with the chunk of the next packet (200). Control module 46 would then examine the next chunk at the head of the queue, which will be the first chunk of a new packet, and which could then be shared with the chunk(s) of the previous packet that are already packed in the partially packed cell.

If cell-sharing is not enabled for the queue (NO of 192), or if the cell does not have space to share with a new packet (NO of 194), or if the queue is empty (YES of 196), control module 46 will not cell-share, and will dequeue and transmit the cell into the fabric without cell sharing (182).

The requirement that the first chunk of the next packet has sufficient bytes to fill the cell may be optional, and in some embodiments may be omitted. If this requirement is omitted, then it is possible to share data from more than two packets in a single cell. This would also be reflected in the enqueue algorithm. For ease of explanation, the above discussion focuses on the example of sharing a cell between at most two packets, but the principles described herein can readily be extended to sharing a cell between more than two packets.

In this manner, the cell-sharing techniques described herein adjust dynamically to a state of fabric congestion, and employ cell-sharing accordingly. When the fabric is not congested, packets are typically transmitted promptly, without necessarily waiting for a following packet to cell-share with. When the fabric is congested, the packet forwarding engine will automatically share cells among enqueued packets.

While one main example has been described above for implementing cell-sharing, other mechanisms may alternatively be used for implementing cell-sharing. For example, a mechanism may be based on fabric request groups. In one embodiment, an ingress PFE may group together contiguous packets in each of the fabric-facing queues of the ingress PFE, and sending the fabric requests for the grouped packets as a bundle to the egress PFE. One example fabric-sharing mechanism may require that packets within such groups should share fabric cells. For example, the first queue entry for a packet contains a cell-count field indicating the length of the packet in a number of fabric cells. To determine the total cell count associated with a request group, the cell counts are added up for all of the packets in the request group. To enable cell-sharing a long a thirty-two byte boundary, the cell-count encoding space may be increased so as to express the cell count information in thirty-two bytes (i.e., half-cells) instead of sixty-four byte quantities (whole cells). To determine the number of fabric cells associated with a request group, the sum of the cell count fields is rounded up to the next even number, and the result is divided by two. This number of fabric cells associated with the request group is then what is transmitted in the fabric request to the egress PFE.

In some embodiments, the cell-sharing techniques described above may be applied in contexts other than communication between PFEs over a switch fabric. For example, the cell-sharing techniques may be applied to communication between PFEs and interface cards, sometimes in a point-to-point fashion. In this manner, the cell-sharing techniques described above with respect to communication between PFEs over a switch fabric may be applied more generally in the context of a network device having at least two nodes connected by a path, wherein the nodes may be one or more of PFEs or interface cards/line cards.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, or other computer-readable storage media. It should be understood that the term "computer-readable storage media" refers to physical storage media, and not signals, carrier waves, or other transient media.

Various embodiments of the invention have been described. These and other embodiments are within the scope of the following claims.

The invention claimed is:

1. A method comprising:
receiving a plurality of packets from a network with one of a plurality of packet forwarding engines (PFEs) of a router, wherein the plurality of PFEs are interconnected by a switch fabric;
determining an egress one of the PFEs for each of the packets;
forming a fixed-sized fabric cell that shares data associated with the plurality of packets that are destined for the same egress PFE while preventing packets destined for different egress PFEs to share the fabric cell; and
transmitting the fabric cell through the switch fabric to communicate the packets to the egress PFEs.

2. The method of claim 1, further comprising:
maintaining a plurality of fabric queues within each of the PFEs to enqueue the packets prior to transmitting the packets through the switch fabric in the form of the fabric cells, wherein within each of the PFEs each of the fabric queues is assigned to one of the PFEs reachable through the switch fabric; and
upon receiving the packets from the network, enqueueing the packets with the plurality of fabric queues based on the egress PFEs determined for the packets so that only packets associated with the same egress PFE are assigned to the same fabric queue.

3. The method of claim 2, wherein forming the fixed-size fabric cells comprises forming the fabric cells so that packets assigned to the same queue are permitted to share a same one of the fabric cells.

4. The method of claim 2, wherein enqueueing the packets comprises:
storing data from payloads of the packets to input buffers within the PFEs; and
enqueuing pointers to the stored data within respective ones of the plurality of fabric queues.

5. The method of claim 2, further comprising:
maintaining, for each of the fabric queues within each of the PFEs, a count of a number of fabric cells required to transmit a total amount of data associated with the packets within each of the fabric queues; and
scheduling the transmission of the fabric cells through the switch fabric based on the count associated with each of the fabric queues within each of the PFEs.

6. A method comprising:
receiving a plurality of packets from a network with one of a plurality of packet forwarding engines (PFEs) of a router, wherein the plurality of PFEs are interconnected by a switch fabric;

determining an egress one of the PFEs for each of the packets;

forming a fixed-sized fabric cell that shares data associated with the plurality of packets that are destined for the same egress PFE while preventing packets destined for different egress PFEs to share the fabric cell;

transmitting the fabric cell through the switch fabric to communicate the packets to the egress PFEs;

maintaining a plurality of fabric queues within each of the PFEs to enqueue the packets prior to transmitting the packets through the switch fabric in the form of the fabric cells, wherein within each of the PFEs each of the fabric queues is assigned to one of the PFEs reachable through the switch fabric;

upon receiving the packets from the network, enqueueing the packets with the plurality of fabric queues based on the egress PFEs determined for the packets so that only packets associated with the same egress PFE are assigned to the same fabric queue;

dequeuing the packets from each of the fabric queues to form the fabric cells; and when dequeuing one of the packets from any of the fabric queues to form one of the fabric cells, dequeuing a portion of an additional packet from the same fabric queue to share the same fabric cell responsive to determining that sufficient data is present in the fabric queue to fill the shared fabric cell.

7. The method of claim 2, wherein forming the fixed-size fabric cells comprises:

enqueuing a portion of a first packet to one of the fabric queues, wherein the portion of the first packet includes an end-of-packet;

outputting a single fabric request onto the switch fabric toward an egress one of the plurality of PFEs to request permission to transmit a cell containing the end-of-packet;

determining whether one of the fabric cells may be shared between the portion of the first one of the packets having the end-of-packet and a portion of a second one of the packets having a start-of-packet; and upon determining that the fabric cell may be shared, adjusting a number of fabric requests to be scheduled for the portion of the second one of the packets having the start-of-packet, such that the single fabric request is the only fabric request sent to request permission for transmitting the shared cell that includes both the end-of-packet of the first packet and the start-of-packet of the second packet.

8. The method of claim 7, wherein determining whether to share the fixed-size cell between the portion of the first packet and the portion of the second packet comprises analyzing the first packet to determine whether all of the following conditions for the first packet are met: (1) cell-sharing is enabled for the queue; and (2) the cell has space to share with a new packet.

9. The method of claim 8, further comprising:

when all of the conditions are met, setting a cell-sharing state associated with the fabric queue in which the first one of the packets is enqueued to indicate that cell-sharing is possible for packet data associated with a most recently enqueued pointer associated with the fabric queue.

10. The method of claim 8, when the conditions are not met, setting a cell-sharing state associated with the fabric queue in which the first one of the packets is enqueued to indicate that cell-sharing is not possible, and outputting accumulated fabric requests for the packet onto the switch fabric toward an egress one of the plurality of PFEs associated with the fabric destination.

11. The method of claim 7, wherein determining whether to share the fixed-size cell between the portion of the first packet and the portion of the second packet comprises analyzing the second packet to determine whether all of the following conditions for the second packet are met: (1) whether the cell-sharing state associated with the queue indicates that cell-sharing is possible; and (2) whether a size of the portion of the second packet having the start-of-packet is sufficient to fill the cell, and wherein when the conditions for the first packet and for the second packet are met, determining that the fixed-size cell may be shared between the portion of the first packet having the end-of-packet and the portion of the second packet having the start-of-packet.

12. The method of claim 1, further comprising:

for each of the fabric cells, transmitting a fabric request to the egress PFE;

receiving a fabric grant from the egress one of the plurality of PFEs in response to the fabric request; and when forming each of the fabric cells, determining whether to share a fabric cell between a portion of a first packet having an end-of-packet and a portion of a second packet having a start-of-packet, wherein the first packet and the second packet are destined for the same egress PFE.

13. The method of claim 1, further comprising:

maintaining a plurality of fabric queues within each of the PFEs to store the packets prior to transmitting the packets through the switch fabric in the form of the fabric cells, wherein within each of the PFEs each of the fabric queues is assigned to one of the PFEs reachable through the switch fabric; and upon receiving the packets from the network, enqueueing the packets with the plurality of fabric queues based on the egress PFEs determined for the packets so that only packets associated with the same egress PFE are assigned to the same fabric queue;

when enqueuing the packets in the fabric queues, applying an algorithm to update state data associated with each of the queues to indicated whether a last packet enqueued in each of the respective fabric queues allows a fabric cell to be shared;

when forming the fabric cells, dequeuing the packets from the fabric queues and applying the same algorithm to determine whether to share a fabric cell between the dequeued packets.

14. The method of claim 13, wherein determining whether to share the fabric cell while dequeuing the packet data comprises:

analyzing a portion of a first packet having an end-of-packet to determine whether the following conditions for the portion of the first packet are met: (1) cell-sharing is enabled for the queue; and (2) the cell has space to share with a new packet; and analyzing a portion of a second packet having a start-of-packet to determine whether the following condition for the portion of the second packet is met: (1) whether a size of the portion of the second packet having the start-of-packet is sufficient to fill the cell; and when the conditions for the portion of the first packet and the condition for the portion of the second packet are met:

determining that the fixed-size cell may be shared between the portion of the first packet having the end-of-packet and the portion of the second packet having the start-of-packet; and outputting the shared cell onto the switch fabric toward the fabric destination.

15. The method of claim 1, wherein a cell-sharing boundary size is configured as half of the fixed-size cell size.

16. The method of claim 1, wherein a cell-sharing boundary size is configured as one quarter of the fixed-size cell size.

17. The method of claim 1, wherein forming the fixed-sized fabric cells comprises forming fixed-size fabric cells that share data associated with two of the packets destined for the same egress PFE.

18. The method of claim 1, wherein forming the fixed-sized fabric cells comprises forming fixed-size fabric cells that share data associated with greater than two of the packets destined for the same egress PFE.

19. The method of claim 1, further comprising determining whether cell-sharing is possible for a packet most recently placed in a queue based on analysis of the queue without reference to explicit cell-sharing state.

20. The method of claim 1, wherein forming cells comprises segmenting data contained in a payload of the first packet into the fabric cells for transmission over the switch fabric.

21. A router comprising:
a plurality of interfaces for receiving a plurality of packets from a network;
a plurality of packet forwarding engines (PFEs) each coupled to at least one or more of the plurality of interfaces; and
a switch fabric that interconnects the plurality of PFEs;
wherein an ingress one of the PFEs forms a fixed-sized fabric cell that shares data associated with the plurality of packets that are destined for the same egress PFE while preventing packets destined for different egress PFEs to share the fabric cell; and
wherein the ingress one of the PFEs transmits the fabric cell through the switch fabric to communicate the packets to the egress PFEs.

22. The router of claim 21, further comprising:
a plurality of fabric queues within each of the PFEs to enqueue the packets prior to the PFEs transmitting the packets through the switch fabric in the form of the fabric cells, wherein within each of the PFEs each of the fabric queues is assigned to one of the PFEs reachable through the switch fabric; and
wherein, upon receiving the packets from the interfaces, the PFEs enqueue the packets with the plurality of queues based on the egress PFEs determined for the packets so that only packets associated with the same egress PFE are assigned to the same fabric queue.

23. The router of claim 22,
wherein the PFEs form the fixed-sized fabric cells so that packets assigned to the same queue are permitted to share a same one of the fabric cells.

24. The router of claim 22, further comprising:
input buffers within the PFEs for storing data from payloads of the packets, and
wherein the PFEs enqueue pointers to the stored data within respective ones of the plurality of fabric queues.

25. The router of claim 22, further comprising:
wherein each of the PFEs maintains, for each of the fabric queues within each of the PFEs, a count of fabric cells required to transmit a total amount of data associated with the packets within each of the fabric queues; and
wherein the PFEs schedule the transmission of the fabric cells through the switch fabric based on the count associated with each of the fabric queues within each of the PFEs.

26. The router of claim 25,
wherein the PFEs dequeue the packets from each of the fabric queues to form the fabric cells, and, when dequeuing one of the packets from any of the fabric queues to form one of the fabric cells, the PFEs dequeue a portion of an additional packet from the same fabric queue to share the same fabric cell when the count associated with the fabric queue indicates sufficient data in the fabric queue to fill the shared fabric cell.

27. The router of claim 22,
wherein one of the PFEs enqueues a portion of a first packet to one of the fabric queues, wherein the portion of the first packet includes an end-of-packet,
wherein the one of the PFEs outputs a single fabric request onto the switch fabric toward an egress one of the plurality of PFEs to request permission to transmit a cell containing the end-of-packet;
wherein the one of the PFEs determines whether one of the fabric cells may be shared between the portion of the first one of the packets having the end-of-packet and a portion of a second one of the packets having a start-of-packet; and
wherein, upon determining that the fabric cell may be shared, the one of the PFEs decrements number of fabric requests to be scheduled for the portion of the second one of the packets having the start-of-packet, such that the single fabric request is the only fabric request sent to request permission for transmitting the shared cell that includes both the end-of-packet of the first packet and the start-of-packet of the second packet.

28. The router of claim 27,
wherein the one of the PFEs determines whether to share the fixed-size cell between the portion of the first packet and the portion of the second packet comprises analyzing the first packet to determine whether all of the following conditions for the first packet are met: (1) cell-sharing is enabled for the queue; and (2) the cell has space to share with a new packet.

29. The router of claim 28,
wherein when all of the conditions are met, the one of the PFEs sets a cell-sharing state associated with the fabric queue in which the first one of the packets is enqueued to indicate that cell-sharing is possible for packet data associated with a most recently enqueued pointer associated with the fabric queue.

30. The router of claim 28,
wherein when the conditions are not met, setting a cell-sharing state associated with the fabric queue in which the first one of the packets is enqueued to indicate that cell-sharing is not possible, and outputting accumulated fabric requests for the packet onto the switch fabric toward an egress one of the plurality of PFEs associated with the fabric destination.

31. The router of claim 27,
wherein the one of the PFEs determines whether to share the fixed-size cell between the portion of the first packet and the portion of the second packet comprises analyzing the second packet to determine whether all of the following conditions for the second packet are met: (1) whether the cell-sharing state associated with the queue indicates that cell-sharing is possible; and (2) whether a size of the portion of the second packet having the start-of-packet is sufficient to fill the cell, and wherein when the conditions for the first packet and for the second packet are met, the one of the PFEs determines that the fixed-size cell may be shared between the portion of the first packet having the end-of-packet and the portion of the second packet having the start-of-packet.

32. The router of claim 21, wherein, for each of the fabric cells, one of the PFEs transmits a fabric request to the egress PFE;

wherein the PFE receives a fabric grant from the egress one of the plurality of PFEs in response to the fabric request, and, when forming each of the fabric cells, determines whether to share a fabric cell between a portion of a first packet having an end-of-packet and a portion of a second packet having a start-of-packet, wherein the first packet and the second packet are destined for the same egress PFE.

33. The router of claim 21, further comprising:

a plurality of fabric queues maintained within each of the PFEs to store the packets prior to transmitting the packets through the switch fabric in the form of the fabric cells, wherein within each of the PFEs each of the fabric queues is assigned to one of the PFEs reachable through the switch fabric; and wherein upon receiving the packets from the network, the PFEs enqueue the packets with the plurality of fabric queues based on the egress PFEs determined for the packets so that only packets associated with the same egress PFE are assigned to the same fabric queue;

wherein, when enqueuing the packets in the fabric queues, the PFEs apply an algorithm to update state data associated with each of the queues to indicated whether a last packet enqueued in each of the respective fabric queues allows a fabric cell to be shared, and, when forming the fabric cells, the PFEs dequeue the packets from the fabric queues and applying the same algorithm to determine whether to share a fabric cell between the dequeued packets.

34. The router of claim 33, wherein when determining whether to share the fabric cell while dequeuing the packet data, the one of the PFEs analyzes a portion of a first packet having an end-of-packet to determine whether the following conditions for the portion of the first packet are met: (1) cell-sharing is enabled for the queue; and (2) the cell has space to share with a new packet, and analyzes a portion of a second packet having a start-of-packet to determine whether the following condition for the portion of the second packet is met: (1) whether a size of the portion of the second packet having the start-of-packet is sufficient to fill the cell, and wherein when the conditions for the portion of the first packet and the condition for the portion of the second packet are met, the one of the PFEs determines that the fixed-size cell may be shared between the portion of the first packet having the end-of-packet and the portion of the second packet having the start-of-packet, and outputs the shared cell onto the switch fabric toward the fabric destination.

35. A computer-readable storage medium comprising instructions for causing a programmable processor to:

receive a plurality of packets from a network with one of a plurality of packet forwarding engines (PFEs) of a router, wherein the plurality of PFEs are interconnected by a switch fabric;

determine an egress one of the PFEs for each of the packets;

form a fixed-sized fabric cell that shares data associated with the plurality of packets that are destined for the same egress PFE while preventing packets destined for different egress PFEs to share the fabric cell; and transmit the fabric cell through the switch fabric to communicate the packets to the egress PFEs.

36. A method comprising:

receiving a first packet with one of a plurality of packet forwarding engines (PFEs) of a router, wherein the plurality of PFEs are interconnected by a switch fabric;

determining a destination PFE for the first packet;

enqueuing chunks of data for the first packet in a queue associated with the destination PFE;

determining a number of fixed-size cells needed for transmission of the chunks of data for the first fabric over a switch fabric to a fabric destination of the router;

determining whether a fixed-size cell may be shared between a portion of the first packet having an end-of-packet and a portion of a second packet received by the one of the plurality of PFEs having a start-of-packet, wherein the second packet is destined for the same fabric destination as the first packet; and upon determining that the fixed-size cell may be shared, adjusting a number of fabric requests to be scheduled for the portion of the second one of the packets having the start-of-packet, such that the single fabric request is the only fabric request sent to request permission for transmitting the shared cell that includes both the end-of-packet of the first packet and the start-of-packet of the second packet.

37. A method comprising:

receiving a plurality of packets from a network with one of a plurality of nodes of a network device, wherein the plurality of nodes are interconnected by paths;

determining an egress one of the nodes for each of the packets;

forming a fixed-sized fabric cell that shares data associated with the plurality of packets that are destined for the same egress node while preventing packets destined for different egress nodes to share the fabric cell; and transmitting the fabric cell through the paths to communicate the packets to the egress nodes.

38. The method of claim 37, wherein the plurality of nodes comprise at least one of an interface card and a packet forwarding engine (PFE).

39. The method of claim 37, wherein the paths comprise a switch fabric within the network device.

40. The method of claim 37, wherein the paths comprise a point-to-point connection within the network device.

* * * * *